United States Patent [19]

Powell et al.

[11] Patent Number: 5,033,326
[45] Date of Patent: Jul. 23, 1991

[54] SHAFT FOR MANUALLY GUIDED LIFT VEHICLES AND LIFT LOADERS

[75] Inventors: Robert Powell, Pforzheim; Rainer Uerlings, Rutesheim; Thomas Montanus, Mönsheim, all of Fed. Rep. of Germany

[73] Assignee: Dr. Ing. h.c.F. Porsche AG, Fed. Rep. of Germany

[21] Appl. No.: 443,364

[22] Filed: Nov. 30, 1989

[30] Foreign Application Priority Data

Dec. 1, 1988 [DE] Fed. Rep. of Germany ....... 3840801

[51] Int. Cl.$^5$ ..................... B62K 21/18; H01H 3/16
[52] U.S. Cl. .................. 74/551.4; 74/551.5; 74/491; 200/332.2; 180/19.1
[58] Field of Search ............. 74/552, 557, 551.4, 74/551.9, 491; 200/61.54, 61.85, 293.1, 332.2; 180/19.1

[56] References Cited

U.S. PATENT DOCUMENTS

| | | | |
|---|---|---|---|
| 2,850,003 | 9/1958 | Konle | 180/19.1 |
| 2,960,886 | 11/1960 | Cunningham | 180/19.1 |
| 3,187,829 | 6/1965 | Ulinski | 180/19.1 |
| 3,190,994 | 6/1965 | Becker et al. | 200/61.85 |
| 4,174,473 | 11/1979 | Brenneman | 200/332.2 |
| 4,198,721 | 4/1980 | Copeland | 200/332.2 |
| 4,384,497 | 5/1983 | Gatsos | 74/551.4 |
| 4,578,592 | 3/1986 | Nakazawa et al. | 200/61.54 |
| 4,682,509 | 7/1987 | Takamiya et al. | 74/551.4 |

FOREIGN PATENT DOCUMENTS

| | | | |
|---|---|---|---|
| 2319618 | 11/1974 | Fed. Rep. of Germany | 74/557 |
| 2932238 | 2/1981 | Fed. Rep. of Germany | 200/61.85 |

OTHER PUBLICATIONS

Förder-/Lagertechnik—Transport und Lager, 12/1982.
BT Lifters-Die Kraft und die Beweglichkeit.

Primary Examiner—Leslie A. Braun
Assistant Examiner—Winnie Yip
Attorney, Agent, or Firm—Evenson, Wands, Edwards, Lenahan & McKeown

[57] ABSTRACT

A shaft for manually guided lift vehicles and lift loaders provided with a driving mechanism has a steering head at the free end containing gripping handles for steering the vehicle and operating switches for the driving and lifting operations of the vehicle. The steering head comprises two cup elements which are detachably connected with one another. One cup element is fixedly connected with the shaft and serves as the supporting part for the second cup element at which the gripping handles as well as the operating switches are located.

17 Claims, 3 Drawing Sheets

SHAFT FOR MANUALLY GUIDED LIFT VEHICLES AND LIFT LOADERS

BACKGROUND AND SUMMARY OF THE INVENTION

The invention relates to a shaft for manually guided lift vehicles and lift loaders equipped with a driving mechanism which has a steering head at its free end that contains gripping handles and operating switches for the driving and lifting operation of the vehicle.

A steering head on a shaft of a lift vehicle is known which comprises operating gripping handles directly connected with the stem of the shaft as well as having actuating control switches for the lift vehicle. Gripping handles are supported at a stem of the steering head by means of bows. The steering heads, during operation of the lift vehicles are subjected to multiple stress as a result of improper operating and handling which may damage parts of the steering head making the lift vehicle inoperative.

It is an object of the invention to provide an improved steering head which has an easily exchangeable design.

According to the invention, this object is achieved by having the steering head comprising two cup elements which are detachably connected with one another. One cup element is fixedly connected with the shaft and is constructed as a supporting part for the second cup element, which contains the gripping handles as well as the operating switches.

It is advantageous if the supporting part is provided with at least two supporting noses which are arranged at a distance from each other and at opposite sides of a stem of the shaft. Corresponding supporting noses are provided on the second cup element, disposed opposite the forementioned supporting noses in a contacting manner. Fastening screws for connecting the two cup elements with one another are located in the noses.

It is also advantageous if the second cup element has an arcuately shaped cross-section and a bent connecting leg with a front edge which is provided with a surrounding shoulder into which a front edge of the supporting part overlaps from the outside. By such a construction the two cups are form-lockingly held together such that the joint that locks the outer surfaces of the two cup elements extends in a flush manner at the connecting area. To provide better support is preferable if the two cup elements each have receiving bores for the fastening screws that have axes that extend at a distance from the switch and from the gripping handle.

Plug in connections can be used to connect electrical connecting lines (from the switches on the second cup element) to the feeding lines in the supporting part.

The principal advantage achieved by the invention is, that as a result of its two-piece construction, the steering head is easily and rapidly exchangeable when the part of the steering head receiving the operating elements is damaged. This limits the time that the vehicle cannot be used and does not require the vehicle to be taken out of service.

In order to achieve this rapid exchanging of the one element of the steering head in a simple manner, the head is formed of two parts connected by way of two screws and with the supporting part at the shaft stem. The fastening screws can be reached in a straight line by means of a screwdriver without any impairment by any parts of the steering head.

By means of the special development of the two cup elements of the steering head with corresponding supporting noses and mutually engaging connecting edges, a sturdy structural unit is provided. Here the cup element (connected with the stem) essentially absorbs the forces occurring at the steering head.

So that a fast and problem-free disconnecting and connecting of the electrical lines takes place, the electrical feeding lines are connected with the other lines leading to the operating switches through one or more electrical plugs.

Other objects, advantages and novel features of the present invention will become apparent from the following detailed description of the invention when considered in conjunction with the accompanying drawings.

DETAILED DESCRIPTION OF THE DRAWINGS

Figure 1:
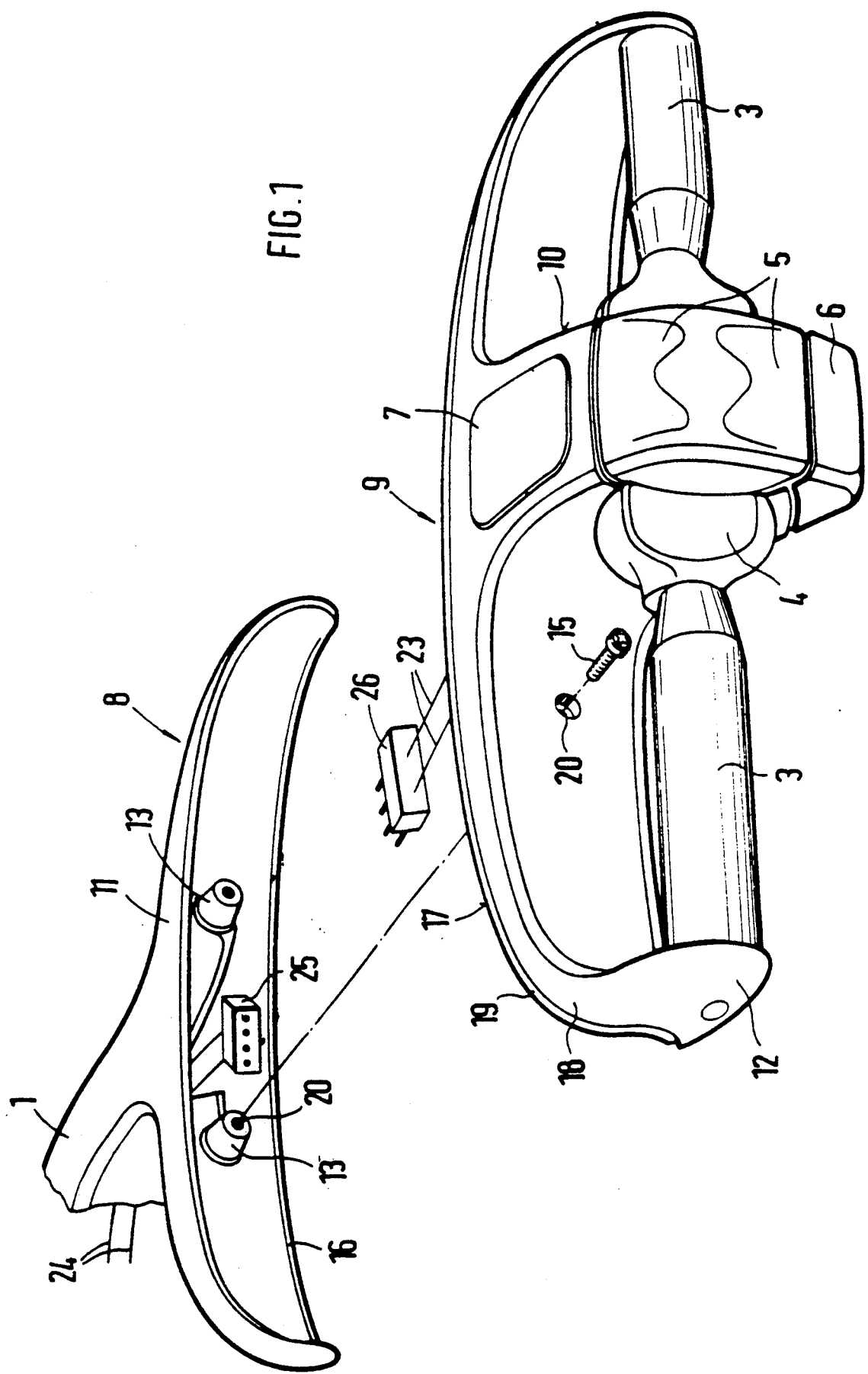
FIG. 1 is a schematic representation of a two-piece steering head consisting of a supporting part and a cup element.

A lift vehicle or lift loader (not shown) has a shaft 1 with a stem connected to a steering head 2 for operating and driving purposes. This steering head 2 comprises two gripping handles 3 for guiding the vehicle and operating elements for control of the vehicle, such as a driving control device 4, a lifting and lowering switch 5, an emergency switch 6 and a horn 7.

The steering head 2 consists of two cup elements 8 and 9 which are detachably connected with one another. The first cup element 8 is formed as a part of the shaft 1, is constructed in one piece with it, and forms a supporting part 11 for the second cup element 9. The second cup-element 9 has a central horn-shaped part 10 which receives the switches and control devices on which the gripping handles 3 are disposed and with their other ends at an inwardly bent end part 12 of the second cup element 9 forming bent connecting legs having a front edge.

Projecting supporting noses 13 are arranged on both sides of the stem of the shaft 1 of the supporting part 11. These noses 13 are opposed by additional supporting noses 14 on the second cup element 9. End faces of the mutually corresponding noses 13, 14 are supported on one another and are connected with one another by means of fastening screws 15.

Figure 3:
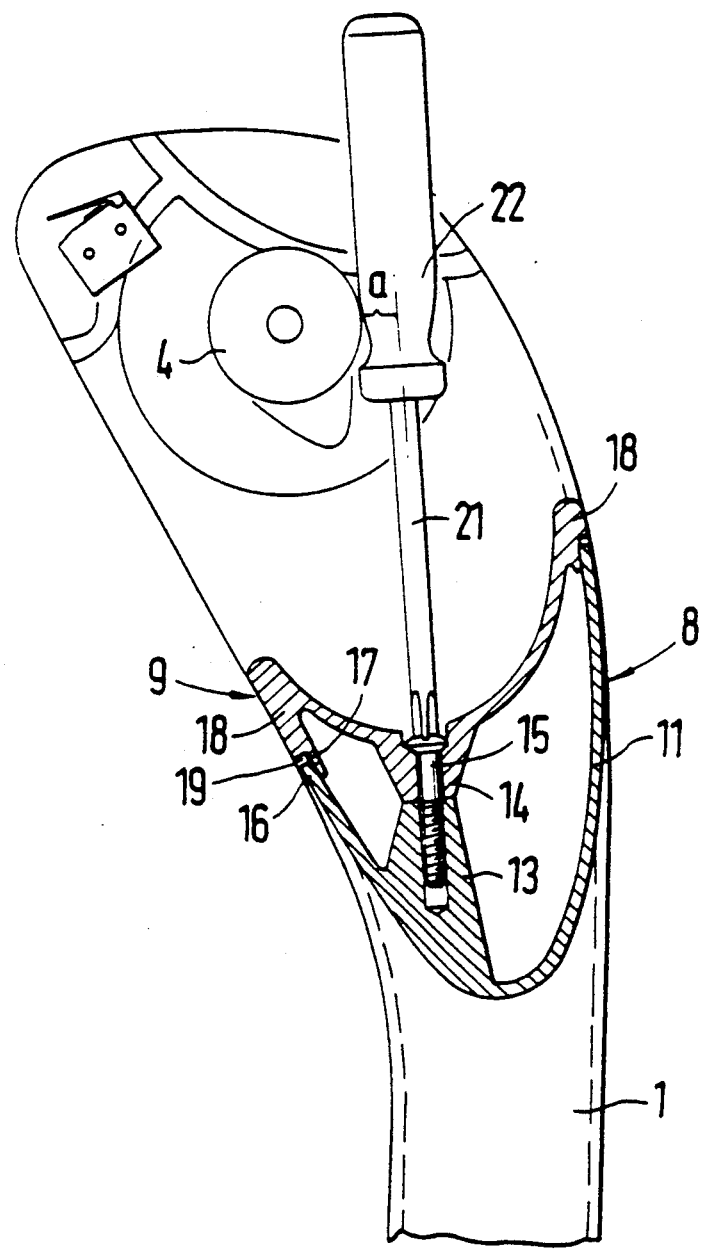
FIG. 3 is a sectional view of the steering head according to Line III—III of FIG. 2 showing the connecting area and the fastening screws.

The surrounding front edges 16, 17 of the two cup elements 8 and 9 are constructed to have mutually engaging or mating configurations so that a continuous flush outer surface is obtained between the first and the second cup element 8 and 9 when they are joined together. For this purpose, the second cup element 8 has a surrounding edge 17 with a shoulder 19 at its bent connecting leg 18 and into which the surrounding edge 16 of the supporting part 11 is disposed in a form-locking manner (see FIG. 3).

Figure 2:
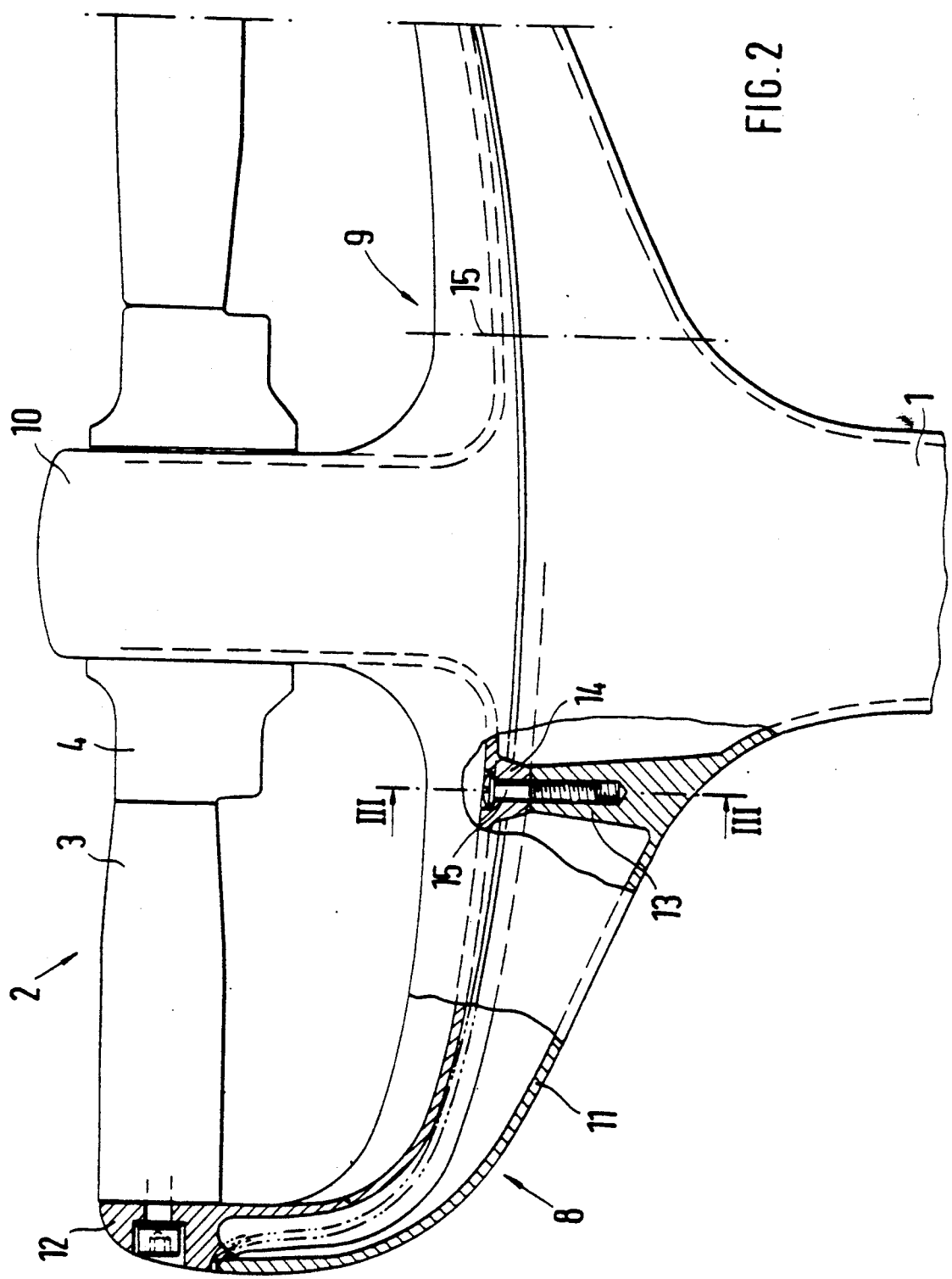
FIG. 2 is a top view of the steering head.

The supporting noses 13 and 14 of the two cup elements 8 and 9 are provided with receiving bores 20 for the screws 15. The axes 21 of these bores 20 extend at a distance a from the switch 4 and from the gripping handle 3. As shown in detail in FIGS. 2 and 3, this distance is selected to be large enough that the screws 15 may easily be unscrewed and screwed in by means of a screwdriver 22 without any contact with parts of the steering head. This ensures a fast exchangeability of the second cup element 9.

The electrical connecting and feeding lines can be connected with one another by means of plugs or plug-in connections 25, 26 to provide for disconnection of the electrical connecting cables or feeding lines 23, 24 between the supporting part 11 and the second cup element 9.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In combination a shaft for manually guided lift vehicles equipped with a driving mechanism and a steering head mounted thereon, said steering head comprising gripping handles mounted thereon;
    wherein the steering head comprises two cup elements;
    wherein a first cup element is fixedly connected with the shaft and acts as a supporting part for a second cup element, said first and second cup elements being detachably connected with one another to facilitate repair of the steering head;
    operating switches mounted within said second cup element for controlling driving and lifting operation of the lift vehicle; and
    wherein the second cup element supports said gripping handles for steering the vehicle as well as said operating switches to control driving and lifting mechanisms of the vehicle whereby said second cup element having said gripping handles and said operating switches may be easily removed for repair.

2. A shaft according to claim 1, wherein the first cup element acting as the supporting part is provided with at least two supporting noses which are arranged spaced from each other at a distance on opposite sides of a stem of the shaft;
    wherein there are additional supporting noses on the second cup element which are disposed opposite the at least two supporting noses of the first cup element acting as the supporting part and in a contacting manner with these at least two supporting noses; and
    wherein fastening screws are provided to connect the two cup elements with one another through the noses.

3. A shaft according to claim 2, wherein the second cup element has an arcuately shaped cross-section and has a bent connecting leg with a front edge which is provided with a surrounding shoulder into which a front edge of the supporting part overlaps from the outside; and
    wherein the two cup elements are so shaped and form-lockingly held together, that outer surfaces of the two cup elements are flush in the overlapping area.

4. A shaft according to claim 3, wherein all the supporting noses of the two cup elements each have receiving bores for the fastening screws; and
    wherein axes of these bores extend at a distance from the operating switches and from the gripping handles.

5. A shaft according to claim 4, wherein an electrical connecting line extends between the switches which are located in the second cup element and a feeding line in the supporting part of the first cup; and
    wherein the connecting line and feeding line are electrically connected to one another by a plug-in connection means.

6. A shaft according to claim 3, wherein an electrical connecting line extends between the switches which are located in the second cup element and a feeding line in the supporting part of the first cup; and
    wherein the connecting line and feeding line are electrically connected to one another by a plug-in connection means.

7. A shaft according to claim 2, wherein all the supporting noses of the two cup elements each have receiving bores for the fastening screws; and
    wherein axes of these bores extend at a distance from the operating switches and from the gripping handles.

8. A shaft according to claim 7, wherein an electrical connecting line extends between the switches which are located in the second cup element and a feeding line in the supporting part of the first cup; and
    wherein the connecting line and feeding line are electrically connected to one another by a plug-in connection means.

9. A shaft according to claim 2, wherein an electrical connecting line extends between the switches which are located in the second cup element and a feeding line in the supporting part of the first cup; and
    wherein the connecting line and feeding line are electrically connected to one another by a plug-in connection means.

10. A shaft according to claim 1, wherein the second cup element has an arcuately shaped cross-section and has a bent connecting leg with a front edge which is provided with a surrounding shoulder into which a front edge of the supporting part overlaps from the outside; and
    wherein the two cup elements are so shaped and form-lockingly held together, that outer surfaces of the two cup elements are flush in the overlapping area.

11. A shaft according to claim 10, wherein an electrical connecting line extends between the switches which are located in the second cup element and a feeding line in the supporting part of the first cup; and
    wherein the connecting line and feeding line are electrically connected to one another by a plug-in connection means.

12. A shaft according to claim 10, wherein all the supporting noses of the two cup elements each have receiving bores for the fastening screws; and
    wherein axes of these bores extend at a distance from the operating switches and from the gripping handles.

13. A shaft according to claim 12, wherein an electrical connecting line extends between the switches which are located in the second cup element and a feeding line in the supporting part of the first cup; and
    wherein the connecting line and feeding line are electrically connected to one another by a plug-in connection means.

14. A shaft according to claim 1, wherein all the supporting noses of the two cup elements each have receiving bores for the fastening screws; and
    wherein axes of these bores extend at a distance from the operating switches and from the gripping handles.

15. A shaft according to claim 14, wherein an electrical connecting line extends between the switches which are located in the second cup element and a feeding line in the supporting part of the first cup; and
    wherein the connecting line and feeding line are electrically connected to one another by a plug-in connection means.

16. A shaft according to claim 1, wherein an electrical connecting line extends between the switches which are located in the second cup element and a feeding line in the supporting part of the first cup; and
    wherein the connecting line and feeding line are electrically connected to one another by a plug-in connection means.

17. In combination a shaft for manually guided lift vehicles equipped with a driving mechanism and a steering head mounted thereon, said steering head comprising gripping handles mounted thereon;
    wherein the steering head comprises two cup elements;
    wherein a first cup element is fixedly connected with the shaft and acts as a supporting part for a second cup element, said first and second cup elements being detachably connected with one another to facilitate repair of the steering head;
    operating switches mounted within said second cup element for controlling driving and lifting operation of the lift vehicle; and
    wherein the second cup element supports said gripping handles for steering the vehicle as well as said operating switches to control driving and lifting mechanisms of the vehicle;
    wherein the second cup element further has an arcuately shaped cross-section with a surrounding front edge having a surrounding shoulder, said first cup element of the supporting part having a mating front edge which overlaps from the outside into the surrounding front edge and shoulder of said second cup element; and
    wherein the two cup elements are held together such that outer surfaces of the two cup elements are flush in the overlapping area and whereby said second cup element having said gripping handles and said operating switches may be easily removed for repair.

* * * * *